March 22, 1927. 1,622,261
C. Q. PAYNE
ELECTROMAGNETIC CLUTCH
Filed Dec. 12, 1925 2 Sheets-Sheet 1
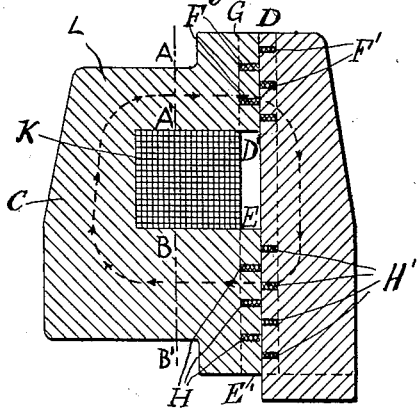
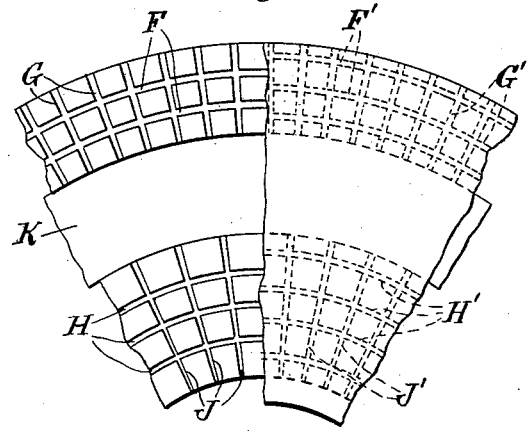
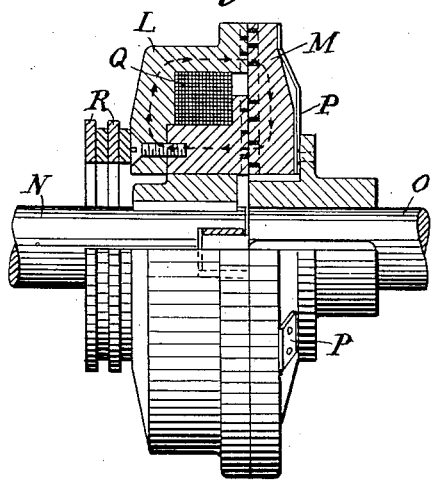
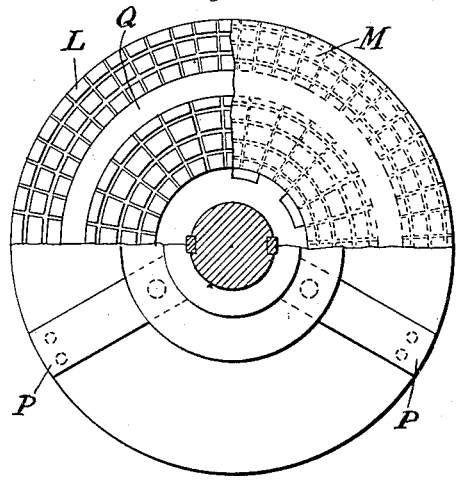
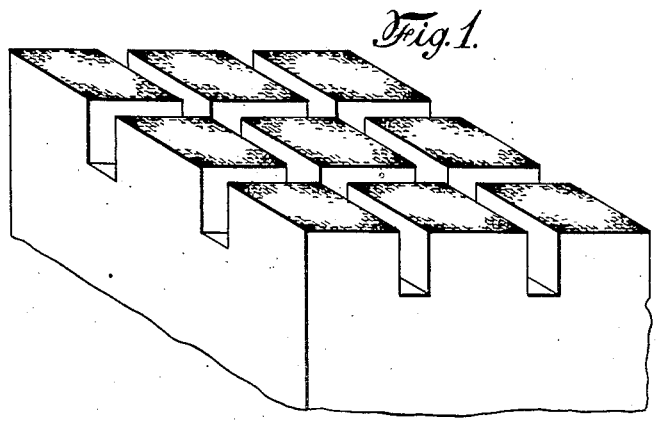
INVENTOR
Clarence Q. Payne
BY Kenyon & Kenyon
ATTORNEY March 22, 1927.

C. Q. PAYNE 1,622,261

ELECTROMAGNETIC CLUTCH

Filed Dec. 12, 1925  2 Sheets-Sheet 2

INVENTOR
Clarence Q. Payne
BY Kenyon & Kenyon
ATTORNEY

Patented Mar. 22, 1927.

1,622,261

UNITED STATES PATENT OFFICE.

CLARENCE Q. PAYNE, OF NEW YORK, N. Y.

ELECTROMAGNETIC CLUTCH.

Application filed December 12, 1925. Serial No. 74,940.

This invention relates to improvements in electromagnetic clutches, and similar electromagnetic engaging devices, such as brakes, etc., whereby the torque may be notably increased for a given magnetizing force.

It consists of means whereby the sliding resistance of magnetized surfaces in contact may be further increased when employing flux distortion of the lines of force thereon in the manner explained in my Patent No. 1,519,417.

It also consists of additional means for controlling and reducing the wear of the magnetized surfaces of the engaging members which rub upon each other in starting and stopping.

It also consists of combinations of elements employing the above means whereby a very light and powerful clutch can be constructed.

In the accompanying drawings Fig. 1 shows in isometric view a magnetized surface having intersecting grooves whose effect in producing local concentrations or "banking" of the magnetic lines of force at the intersections is indicated by shading.

Figs. 2 and 3 show in sectional and longitudinal views portions of clutch members having enlarged polar areas, and provided with intersecting grooves along their contact surfaces.

Figs. 4 and 5 show in part cross sectional and end views an application of my invention to a magnetic clutch composed of an electromagnet and an armature.

Figure 6:
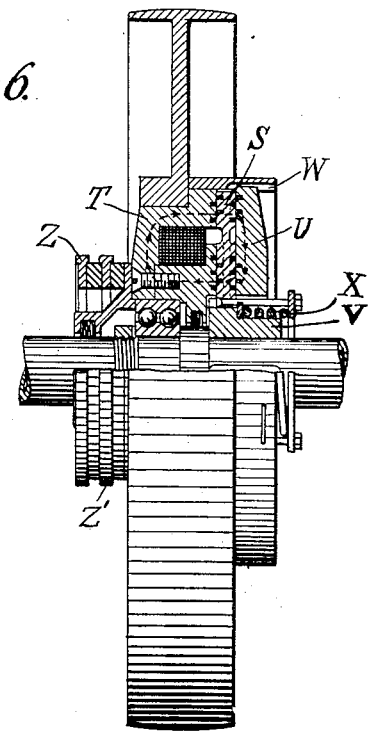
Figs. 6 and 7 show in part sectional and end views a further application of the invention to a magnetic clutch having a disk plate placed between the electromagnet and the armature, whereby the contact areas are increased without increasing the diameter of the clutch or the magnetomotive force employed. In this way a very light clutch having a powerful driving torque is obtained.

In my Patent No. 1,519,417 I have pointed out the broad distinction in magnetic clutches arising from the presence and absence of an air gap between the engaging members, and the advantage of greatly reduced weight in the type which transmits power by direct contact of the engaging members without an intervening air gap in its magnetic circuit. In the above patent I have also described and claimed broadly means for increasing the sliding resistance of surfaces in magnetic contact, or in extremely close proximity, by establishing wide differences of magnetic density or flux distortion at numerous points along the plane of contact of the surfaces. This I found is preferably accomplished by numerous local point convergences or condensations of the lines of force along one side of the plane of contact, and then opposing thereto edge convergences of the lines of force on the opposite side thereof. When such surfaces are magnetized and are brought into contact engagement the local differences of magnetic density thus established on the two sides of the plane of contact coact or cooperate to increase very appreciably the sliding resistance of the surfaces. A novel application of the "Isthmus method" of the arrangement of the lines of force is in effect thus obtained. These wide differences of magnetic density increase both the tractive or portative force which the surfaces exert on each other, and also the sliding resistance or resistance to motion parallel to their plane of contact.

My present invention is applied to engaging members of the contact type, and it consists in establishing certain relations between the polar and the core areas of an electromagnet while applying the invention covered by my Patent No. 1,519,417 to the engaging members.

In designing electromagnets for clutches it has heretofore been assumed that the magnetic density at the polar faces should be a maximum, since the attracting force is proportional to the square of the magnetic density, and the coefficient of the sliding resistance depends upon, or is a function of, the attracting force. The mathematical formula for the attracting force which an electromagnet exerts on its armature when in contact with it is:

$$P = \frac{\phi^2}{KS}.$$

The attracting force is thus seen to be directly proportional to the square of the flux density $\phi$, and inversely proportional to the contact area S. This relation, however, applies to the usual design of electromagnet and armature having smooth or ungrooved contact surfaces, and it has been the common practice either to make the polar surfaces of the same area as the core areas of the electromagnet employed, in order to maintain a uniform flux density throughout the magnetic circuit, or else somewhat smaller so as to concentrate it at the polar surfaces.

I have found, on the other hand, that it is desirable and advantageous to make the area of the polar-surfaces of the electromagnet considerably greater than the combined core-areas of the electromagnet, and that the sliding resistance can be increased instead of reduced thereby, when at the same time the principle of my invention involved in a sub-division or redistribution of the lines of force at the polar surfaces is employed. This enlargement of the polar areas may, in certain cases, be as much as 100%.

Figs. 2 and 3 illustrate this relation quite clearly by reference to a portion of an annular bi-polar electromagnet and its armature. Here K, Fig. 2 represents the energizing field-coil of the electro-magnet and the internal field, or the cores of the electro-magnet at the sections $AA^1$ and $BB^1$ are here equal in area and are joined by the yoke or back-piece C, which is so proportioned that it affords a uniform path or area for the lines of force without expanding or choking the magnetic flux within the above limits. By making the areas of the polar faces at $DD^1$ and $EE^1$ greater than the combined cross sectional areas of the core at $AA^1$ and $BB^1$, I have found that notable advantages are thus obtained when applying the principle of my invention already set forth.

While the expanded polar-areas thus reduce the mean density of the lines of force at the faces, yet the increased areas permit a greater number of groove intersections to be cut in them than would othewise be possible, and the effect of the supersaturation of the magnetic density at the points or corners of the intersections as indicated in Fig. 1 then creates greater differences of flux density, or flux distortion at a vast number of places along the contact areas, when edge convergences of the lines of force are superposed upon the point convergences at the groove intersections from the other side of the plane of contact. I have found in this way that the sliding resistance of the engaging members can be notably increased as compared with the polar faces whose areas are equal to or less than the combined core-areas of the electromagnet. The intersecting grooves are shown in Figs. 2 and 3 to be formed by a series of circumferential and radial grooves cut in the contact faces. Here F and $F^1$ and H and $H^1$ represent the circumferential grooves in the electromagnet and armature faces, and G and $G^1$ and J and $J^1$ represent the radial grooves. It will also be seen that the circumferential grooves of the contact surfaces are preferably placed in staggered relations to each other whereby point concentrations of the lines of force on one side of the contact plane are opposed to edge concentrations on the opposite side reciprocally with respect to both sides of said plane. In this way the maximum flux distortion and increased sliding resistance is obtained by the wide differences of magnetic density thus established. I have found that the increase in the polar-areas should considerably exceed the decrease in area due to the grooves themselves, in order to attain the advantage of maximum sliding resistance of the contact surfaces explained above.

An application of my invention to a complete magnetic clutch is illustrated in Figs. 4 and 5. In this case the clutch is utilized as a shaft coupling. An annular electromagnet L and its armature M are mounted on separate hubs keyed to the opposed ends of the shafts N and O, and are so placed with reference to each other that they form parts of the same magnetic circuit. The armature M is held by means of springs P in contact with flanged shoulders of its driving hub, and out of engagement with the electromagnet when the latter is not charged. It slides upon a series of keys in the hub seat by means of key ways placed upon its inner circumference when it is moved a short distance against the pressure of the springs P to make contact engagement with the polar-faces of the electromagnet. The field coil Q is energized by an electric current from an outside source of power, and is conveyed to it by means of the insulated collector rings R and suitable contact brushes. The electromagnet L being thus the driving member causes the armature M to be brought into contact engagement with it when energized, and power is then transmitted to the shaft O. A high efficiency is thus obtained; viz., the ratio of the power transmitted to the amount of energizing current employed by reason of the high coefficient of friction developed by the vast number of local concentrations and differences of magnetic density established on both sides of the enlarged contact areas of the engaging members, by means of the staggered groove intersections as illustrated in Figs. 4 and 5, as well as in Figs. 2 and 3.

Figure 7:
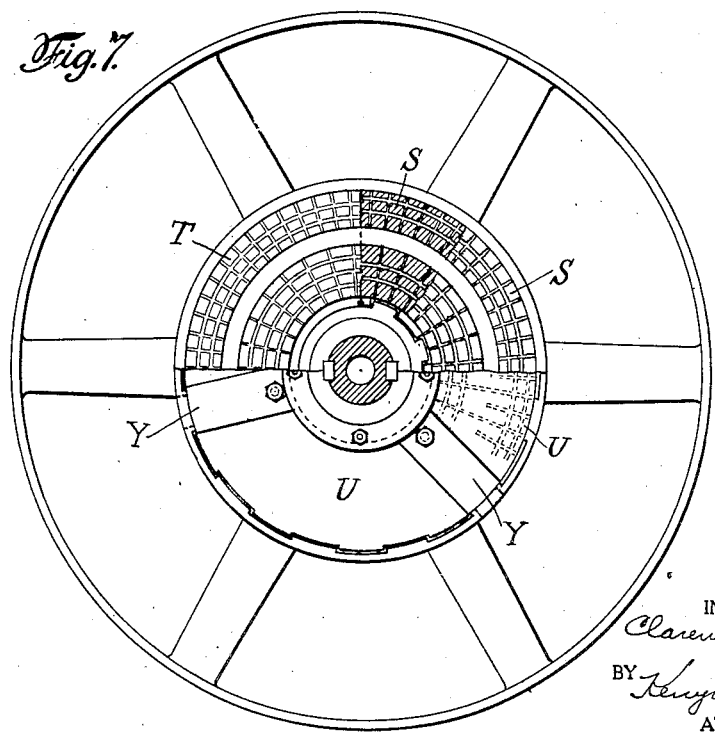

A further application of my invention is shown in Figs. 6 and 7 by sectional side and end views of a magnetic clutch, which here serves the purpose of a clutch pulley. A light magnetic disc-plate S is mounted between the electromagnet T and its armature U. The upper and lower annular areas of this disc-plate, as well as the enlarged polar faces of the electromagnet and the opposing armature surfaces are shown here provided with intersecting grooves placed in staggered relation to each other, as shown in Figs. 6 and 7, in order to obtain the maximum flux distortion when in contact as already explained in connection with Figs. 4 and 5. The disc plate S is mounted slidably by means of keys and keyways at its inner circumference upon its hub V, while the armature is held similarly at its outer circumference by the driving sleeve W. Both the disc plate S and the armature U are respectively held out of contact engagement with each other and with the electromagnet T by the spiral spring X and the spring plates Y when the electromagnet is not energized. Electric current to energize the electromagnet is conveyed to it by means of insulated collector rings shown at Z and Z' from contact brushes connected with an outside source of power. When so energized the dis-plate and the armature are brought into contact engagement with the electromagnet and they then form parts of the same magnetic circuit as indicated by the broken line joining them.

By thus increasing the number of the magnetized surfaces in contact, and providing them with intersecting grooves while giving each contact surface an increased area in relation to the corresponding core area of the electro-magnet, it becomes possible to construct a very light and efficient clutch having a powerful driving torque by reason of the vast number of local concentrations of magnetic density and flux distortions thus established on both sides of the contact surfaces, which co-operate to increase the sliding resistance of the engaging members.

Other applications and adaptations of my invention will be apparent to those skilled in the art.

In order to resist wear of the contact surfaces of the clutch which are subjected to a rubbing action in starting and stopping, I find it preferable to employ means for increasing the hardness of the metal at the contact surfaces, as well as to provide means for automatic or self-lubrication. The electromagnet and armature are preferably made of soft iron; i. e., iron low in carbon content, in order to secure a high permeability throughout the circuit of the magnetic lines of force. Such iron is, however, physically soft and its contact surfaces are apt to "seize", i. e., scratch and abrade when subjected to pressure and rubbing when they are thrown in and out of engagement by energizing and de-energizing the electromagnet. In my present invention I overcome this reaction by hardening the contact surfaces. This I find can be best accomplished by carbonizing the surfaces by exposing them to a high temperature in the presence of pure carbon for a regulated period of time, dependent upon the depth of the carbon penetration desired, and then quenching them suddenly in order to cause the absorbed carbon to combine chemically with the iron. In this way the contact surfaces can be made "glass hard"; a term usually employed to denote that scratching can be accomplished only with difficulty with a file. The depth of the carbonization will vary in different cases with the service desired, but in no case is the combined depths of the carbonization of the contact surfaces sufficient to appreciably affect the magnetic permeability of the iron path of the magnetic flux as a whole.

The magnetic surfaces may in this way be brought into direct contact with each other, and the reluctance of the magnetic circuit to the flux density is not increased by the presence of an air gap or of an equivalent covering, however thin, of a coated material harder than the iron of the electromagnet and armature themselves.

My present invention also includes a further protection to the hardened contact surfaces by means for lubricating them. In accomplishing this purpose I fill the grooves of the contact surfaces with a material considerably softer than the iron of the magnet and armature, so that an infinitesimal film thereof may be constantly superposed upon the hardened surfaces of the engaging clutch members. Such a material may either be graphite or a soft metal alloy, such as babbitt, etc. It may also be a metal like copper, etc., in which a lubricating material like graphite has been impregnated. The use of copper filling strips has a further advantage in that they increase the torque when the engaging surfaces of the members move relatively to each other by reason of the eddy or Foucault currents which are thus generated. The clutch members thus become especially applicable for braking purposes where slipping is desirable. In this way the clutch or brake faces are rendered self-lubricating and free from the danger of seizing while their durability is insured in spite of the high pressure and heat to which they may be subjected under severe service conditions.

Having thus described my invention, what I claim as new and desire to secure by Letters Patent is:

1. An electromagnetic engaging device comprising an armature and an electromagnet whose polar surfaces are greater in area than the combined cross-sectional core areas of said electromagnet, both of said engaging members having contact surfaces provided with grooves disposed with relation to each other to resist sliding along the plane of contact by the "Isthmus method" of the arrangement of the lines of force thereon, and means for bringing said grooved surfaces into and out of direct contact engagement with each other.

2. In an electromagnetic engaging device, a driving and a driven member comprising an armature and an electromagnet whose polar surfaces are greater in area than the combined cross-sectional core-areas of said electromagnet, means for bringing said armature into and out of contact engagement with said polar areas, and means for creating and so spacing numerous local concentrations of magnetic density on the two sides of the plane of contact of said members that they coact to increase the sliding resistance of said members.

3. In an electromagnetic clutch, a driving and a driven member comprising an armature and an electromagnet whose polar surfaces are greater in area than the combined cross-sectional core-areas of said electromagnet, means for producing and opposing numerous point convergences of the lines of force on one side of the plane of contact of said members to edge convergences on the other side thereof, and means for supplying energizing current to said electromagnet for bringing said members into contact engagement.

4. In an electromagnetic clutch, a driving and a driven member, one of which comprises an electromagnet whose polar surfaces are greater in area than the combined cross-sectional core-areas of said electromagnet, means for producing point concentrations of the magnetic lines of force on one side of the plane of contact of said driving and driven members, and edge concentrations of the lines of force on the other side thereof which register with said point concentrations, and means for supplying energizing current to said electromagnet for bringing the magnetized areas of said members into contact engagement.

5. In an electromagnetic clutch, an electromagnet whose polar-surfaces are greater in area than the combined cross-sectional core-areas of said electromagnet, and whose polar-surfaces are provided with intersecting grooves.

6. In an electromagnetic clutch, a driving and a driven member comprising an armature and an electromagnet whose polar-surfaces are greater in area than the combined cross-sectional core-areas of said electromagnet, both of said members having intersecting grooves along their magnetized areas, and means for supplying energizing current to said electromagnet for bringing said magnetized areas into contact engagement with each other.

7. In an electromagnetic clutch, a driving and a driven member comprising an armature and an electromagnet whose polar-surfaces are greater in area than the combined cross-sectional core area of the said electromagnet, in combination with means for producing numerous local point concentrations of the lines of force on one side and edge concentrations of said lines of force opposite said point concentrations on the other side of the plane of contact of said engaging members, said means comprising intersecting grooves placed in staggered relation to each other on the opposite sides of the plane of contact of said members.

8. In an electromagnetic clutch, an electromagnet whose polar surfaces are greater in area than its combined cross-sectional core areas, together with an armature slidably connected to said electromagnet at its outer circumference, and a magnetic disk slidably mounted between said electromagnet and armature, in combination with means for producing point concentrations of the lines of force on one side and edge concentrations of said lines of force opposite said point concentrations on the other side of the respective planes of contact of the said members, and means for supplying energizing current to said magnet for bringing said members into contact engagement.

9. In an electromagnetic clutch, an electromagnet whose polar-surfaces are greater in area than the combined cross-sectional core-areas of said electromagnet, together with an armature yoked to said electromagnet slidably at its outer circumference forming the driven member, in combination with a driving member formed by a magnetic disc mounted slidably between said electromagnet and said armature, means for producing numerous local point concentrations of the lines of force on one side and edge concentrations of said lines of force opposite said point concentrations on the other side of the respective planes of contact of said engaging members, said means comprising intersecting grooves placed in staggered relation to each other on both sides of each plane of contact of said members.

10. In an electromagnetic clutch, engaging members comprising an armature and an electromagnet whose polar-surfaces are greater in area than the combined cross-sectional core-areas of said electromagnet, means for creating and so spacing numerous local concentrations of magnetic density on the two sides of the plane of contact of said members that they coact to increase the sliding resistance of said members, means for resisting wear of the contact surfaces of said members comprising hardening them by carbonization, and means for supplying energizing current to said electromagnet for bringing said members into contact engagement.

11. In an electromagnetic clutch, a driving and a driven member comprising an electromagnet whose polar surfaces are greater in area than its combined cross sectional core areas and an armature, both of which form parts of a single magnetic circuit, means comprising intersecting grooves in the engaging surfaces of said members for increasing the sliding resistance of said members in combination with means for lubricating said engaging surfaces comprising material of greater softness than said members and contained in said grooves, and means for supplying energizing current to said electromagnet for bringing said members into contact engagement.

12. In an electromagnetic clutch, a driving and a driven member comprising an armature and an electromagnet, whose polar-surfaces are greater in area than the combined cross-sectional core-areas of said electromagnet, the engaging surfaces of said electromagnet and armature being wear resistant by carbonization to glass hardness, and provided with intersecting grooves, said grooves containing lubricating material comprising copper bars, and means for supplying energizing current to said electromagnet for bringing said members into contact engagement.

13. In an electromagnetic clutch, an electromagnet whose polar surfaces are greater in area than its combined cross-sectional core areas, and an armature yoked to said electromagnet slidably at its outer circumference, in combination with a driving member comprising a magnetic disc mounted slidably between said electromagnet and said armature, means for producing numerous local point concentrations of the lines of force on one side and edge concentrations of said lines of force opposite said point concentrations on the other side of the respective planes of contact of said engaging members, said means comprising intersecting grooves placed in staggered relation to each other on both sides of each plane of contact of said members.

In testimony whereof, I have signed my name to this specification.

CLARENCE Q. PAYNE.